(12) United States Patent
Kono

(10) Patent No.: US 10,076,018 B2
(45) Date of Patent: Sep. 11, 2018

(54) DISCHARGE LAMP DRIVING DEVICE, PROJECTOR, AND DISCHARGE LAMP DRIVING METHOD

(71) Applicant: SEIKO EPSON CORPORATION, Tokyo (JP)

(72) Inventor: Masaru Kono, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 32 days.

(21) Appl. No.: 15/060,958

(22) Filed: Mar. 4, 2016

(65) Prior Publication Data

US 2016/0278189 A1 Sep. 22, 2016

(30) Foreign Application Priority Data

Mar. 17, 2015 (JP) ................. 2015-053043

(51) Int. Cl.
*H04N 9/31* (2006.01)
*H05B 41/288* (2006.01)

(52) U.S. Cl.
CPC ....... *H05B 41/2883* (2013.01); *H04N 9/3105* (2013.01); *H04N 9/3123* (2013.01); *H04N 9/3155* (2013.01); *H04N 9/3179* (2013.01); *H04N 9/3197* (2013.01); *H05B 41/2887* (2013.01); *Y02B 20/202* (2013.01)

(58) Field of Classification Search
CPC .................................. H04N 9/3197
USPC ........................................ 348/751
See application file for complete search history.

(56) References Cited

U.S. PATENT DOCUMENTS

2008/0024853 A1* 1/2008 Tanaka ............... H05B 41/2883
359/238
2012/0043904 A1* 2/2012 Terashima ......... H05B 41/2928
315/224

(Continued)

FOREIGN PATENT DOCUMENTS

CN 103249234 A 8/2013
EP 2 152 048 A2 2/2010
EP 2 265 095 A1 12/2010

(Continued)

OTHER PUBLICATIONS

Aug. 3, 2016 Extended Search Report issued in European Patent Application No. 16153785.7.

*Primary Examiner* — Jefferey F Harold
*Assistant Examiner* — Justin Sanders
(74) *Attorney, Agent, or Firm* — Oliff PLC

(57) ABSTRACT

A discharge lamp driving device includes a discharge lamp driving unit; and a control unit, in which the control unit controls the discharge lamp driving unit so that a first driving current which causes a first electrode to serve as an anode and a second driving current which causes a second electrode to serve as an anode are alternately supplied to the discharge lamp, a period of the first driving current is changed according to a periodic first pattern, and a period of the second driving current is changed according to a periodic second pattern, in which the first pattern and the second pattern are patterns in which the length of the periods over which the respective driving current is supplied decrease over time within each cycle of the pattern, and in which the cycle of the first pattern is phase-shifted relative to the cycle of the second pattern.

18 Claims, 10 Drawing Sheets

(56) References Cited

U.S. PATENT DOCUMENTS

2012/0313546 A1* 12/2012 Imamura ............ H05B 41/2888
　　　　　　　　　　　　　　　　　　　　　315/287
2013/0207568 A1　　8/2013 Suzuki

FOREIGN PATENT DOCUMENTS

| JP | 2012-014995 A | 1/2012 |
| WO | 2006/051926 A1 | 5/2006 |

* cited by examiner

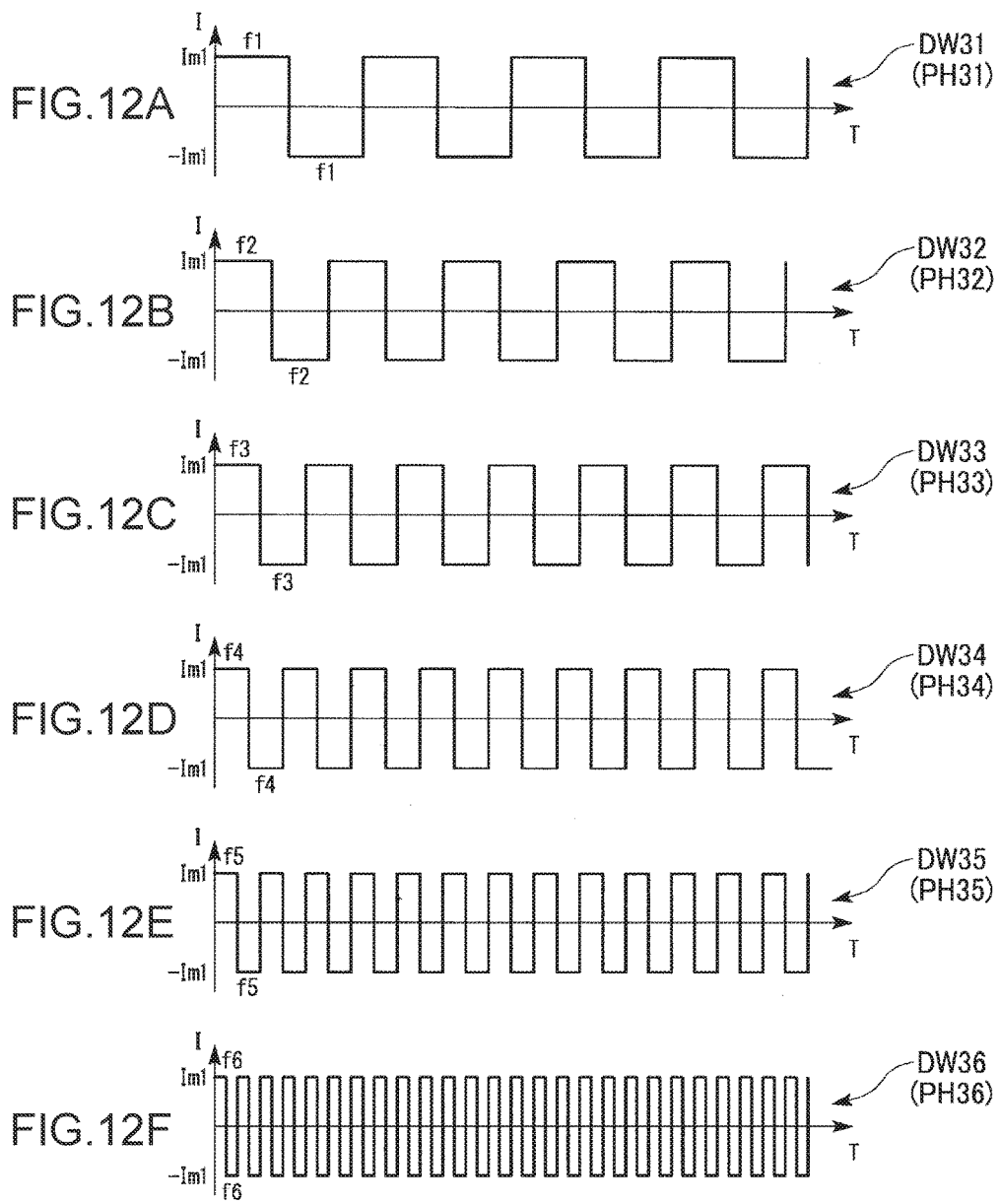

DISCHARGE LAMP DRIVING DEVICE, PROJECTOR, AND DISCHARGE LAMP DRIVING METHOD

BACKGROUND

1. Technical Field

The present invention relates to a discharge lamp driving device, a light source apparatus, a projector, and a discharge lamp driving method.

2. Related Art

For example, JP-A-2012-14995 discloses a technique in which a frequency of an alternating current (AC) is changed in order to continuously maintain a stable discharge state by sustaining the state at a tip of an electrode.

As mentioned above, in a case where an alternating current is supplied to a discharge lamp, a temperature of the electrode increases in a period in which the electrode serves as an anode, and decreases in a period in which the electrode serves as a cathode. For example, in a case where a frequency of the alternating current is low, the period in which the electrode serves as an anode is lengthened, and thus a temperature of the electrode increases so that a protrusion at the tip of the electrode is easily melted.

However, for example, as disclosed in JP-A-2012-14995, in the method of simply changing a frequency, a period in which the electrode serves as a cathode is provided right after the electrode serves as an anode in the same length as the period in which the electrode serves as an anode. For this reason, in a case where a frequency of the alternating current is low, the period in which a temperature of the electrode decreases and the electrode serves as a cathode is also lengthened, and thus the temperature of the electrode cannot be sufficiently increased. Therefore, there is a case where the protrusion at the tip of the electrode may not be sufficiently melted, and thus a shape of the protrusion may not be stably maintained.

SUMMARY

An advantage of some aspects of the invention is to provide a discharge lamp driving device which can stably maintain a shape of a protrusion of an electrode, a light source apparatus including the discharge lamp driving device, and a projector including the light source apparatus. Another advantage of some aspects of the invention is to provide a discharge lamp driving method capable of stably maintaining a shape of a protrusion of an electrode.

A discharge lamp driving device according to an aspect of the invention includes a discharge lamp driving unit configured to supply a driving current to a discharge lamp including a first electrode and a second electrode; and a control unit configured to control the discharge lamp driving unit, in which the driving current includes a first driving current which causes the first electrode to serve as an anode and a second driving current which causes the second electrode to serve as an anode, in which the control unit controls the discharge lamp driving unit so that the first driving current and the second driving current are alternately supplied to the discharge lamp, a period over which the first driving current is supplied is changed according to a periodic first pattern, and a period over which the second driving current is supplied is changed according to a periodic second pattern, in which the first pattern and the second pattern are patterns in which the length of the periods over which the respective driving current decreases over time within each cycle of the pattern, and in which the cycle of the first pattern is phase-shifted relative to the cycle of the second pattern.

In the discharge lamp driving device according to the aspect of the invention, since the cycle of the first pattern is phase-shifted relative to the cycle of the second pattern, it is possible to make a length of a period in which the first driving current is supplied to the discharge lamp different from a length of a period which is provided right thereafter and in which the second driving current is supplied to the discharge lamp. Consequently, a temperature of the first electrode which increases as a result of supplying the first driving current to the discharge lamp can be prevented from decreasing due to the second driving current being supplied to the discharge lamp. Therefore, it is possible to increase a temperature of the first electrode and thus to stably maintain a shape of a protrusion of the first electrode.

The cycle of the first pattern may be phase-shifted relative to the cycle of the second pattern by a half cycle.

With this configuration, it is possible to melt a protrusion of the first electrode and a protrusion of the second electrode with good balance.

Each of the first pattern and the second pattern may have a plurality of frequency periods, the lengths of the periods over which the respective driving current is supplied to the discharge lamp are constant within each frequency period and vary between different frequency periods, and each frequency period has the same length.

With this configuration, it is possible to easily melt a protrusion of the first electrode and a protrusion of the second electrode with better balance.

Each of the first pattern and the second pattern may have a plurality of frequency periods, the lengths of the periods over which the respective driving current is supplied to the discharge lamp are constant within each frequency period and vary between different frequency periods, and lengths of the frequency periods may increase as the frequency periods are provided temporally later in the first pattern and the second pattern.

With this configuration, the protrusions can be more easily caused to grow.

The lengths of the frequency periods may increase arithmetically for each of the frequency periods.

With this configuration, it is easy to further cause the protrusions to appropriately grow.

The periods of the driving current in the frequency periods may decrease geometrically from one frequency period to the next within the first pattern and the second pattern.

With this configuration, it is easy to further cause the protrusions to appropriately grow.

The first pattern and the second pattern may be the same pattern.

With this configuration, it is possible to cause the protrusion of the first electrode and the protrusion of the second electrode to grow with good balance.

A light source apparatus according to another aspect of the invention includes a discharge lamp configured to emit light; and the discharge lamp driving device.

In the light source apparatus according to the aspect of the invention, since the discharge lamp driving device is included, it is possible to stably maintain a shape of the protrusion of the electrode.

A projector according to still another aspect of the invention includes the light source apparatus; a light modulation device configured to modulate light emitted from the light source apparatus according to an image signal; and a projection optical system configured to project the light which is modulated by the light modulation device.

In the projector according to the aspect of the invention, since the light source apparatus is included, it is possible to stably maintain a shape of the protrusion of the electrode.

A discharge lamp driving method according to yet another aspect of the invention is a discharge lamp driving method of supplying a driving current to a discharge lamp including a first electrode and a second electrode and driving the discharge lamp, the method including alternately supplying a first driving current which causes the first electrode to serve as an anode and a second driving current which causes the second electrode to serve as an anode to the discharge lamp; changing a period over which the first driving current is supplied according to a periodic first pattern; and changing a period over which the second driving current is supplied according to a periodic second pattern, in which the first pattern and the second pattern are patterns in which the lengths of the periods over which the respective driving current decrease over time within each cycle of the pattern, and the cycle of the first pattern is phase-shifted relative to the cycle of the second pattern.

In the discharge lamp driving method according to the aspect of the invention, it is possible to stably maintain a shape of the protrusion of the electrode in the above-described manner.

BRIEF DESCRIPTION OF THE DRAWINGS

The invention will be described with reference to the accompanying drawings, wherein like numbers reference like elements.

FIGS. 12A to 12F are diagrams illustrating driving current waveforms in the comparative example.

DESCRIPTION OF EXEMPLARY EMBODIMENTS

Hereinafter, with reference to the drawings, a projector according to embodiments of the invention will be described.

The scope of the invention is not limited to the following embodiments, and can be arbitrarily changed within the scope of the technical spirit of the invention. In the following drawings, for better understanding of each constituent element, a scale, the number, and the like thereof in each structure may be different from a scale, the number, and the like thereof in an actual structure.

First Embodiment

Figure 1:
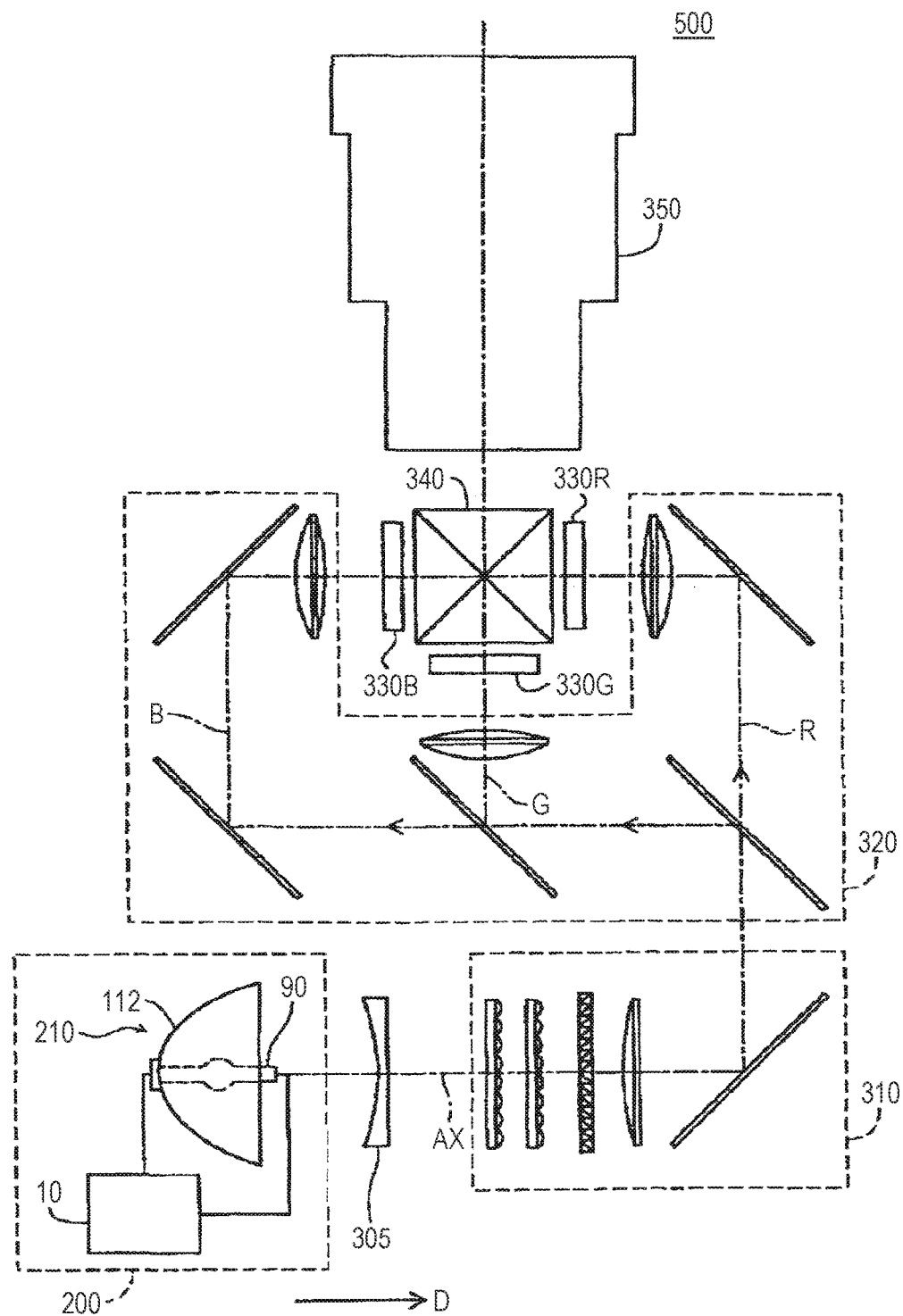
FIG. 1 is a schematic configuration diagram illustrating a projector according to a first embodiment.

As illustrated in FIG. 1, a projector 500 of the present embodiment includes a light source apparatus 200, a collimating lens 305, an illumination optical system 310, a color separation optical system 320, three liquid crystal light valves (light modulation devices) 330R, 330G and 330B, a cross dichroic prism 340, and a projection optical system 350.

Light emitted from the light source apparatus 200 passes through the collimating lens 305 and is incident on the illumination optical system 310. The collimating lens 305 collimates the light from the light source apparatus 200.

The illumination optical system 310 adjusts the illuminance of the light emitted from the light source apparatus 200 so that the illuminance is uniformized on the liquid crystal light valves 330R, 330G and 330B. The illumination optical system 310 aligns polarization directions of the light emitted from the light source apparatus 200 in one direction. This is aimed at effectively using the light emitted from the light source apparatus 200 in the liquid crystal light valves 330R, 330G and 330B.

The light having undergone the adjustment of the illuminance distribution and the polarization directions is incident on the color separation optical system 320. The color separation optical system 320 separates the incident light into three color light beams including red light (R), green light (G), and blue light (B). The three color light beams are respectively modulated according to video signals by the liquid crystal light valves 330R, 330G and 330B which correspond to the respective color light beams. The liquid crystal light valves 330R, 330G and 330B respectively include liquid crystal panels 560R, 560G and 560B which will be described later, and polarization plates (not illustrated). The polarization plates are disposed on a light incidence side and a light emission side of each of the liquid crystal panels 560R, 560G and 560B.

The three modulated color light beams are combined with each other by the cross dichroic prism 340. The combined light is incident on the projection optical system 350. The projection optical system 350 projects the incident light onto a screen 700 (refer to FIG. 3). Thus, a video is displayed on the screen 700. In addition, well-known configurations may be employed as configurations of the collimating lens 305, the illumination optical system 310, the color separation optical system 320, the cross dichroic prism 340, and the projection optical system 350.

Figure 2:
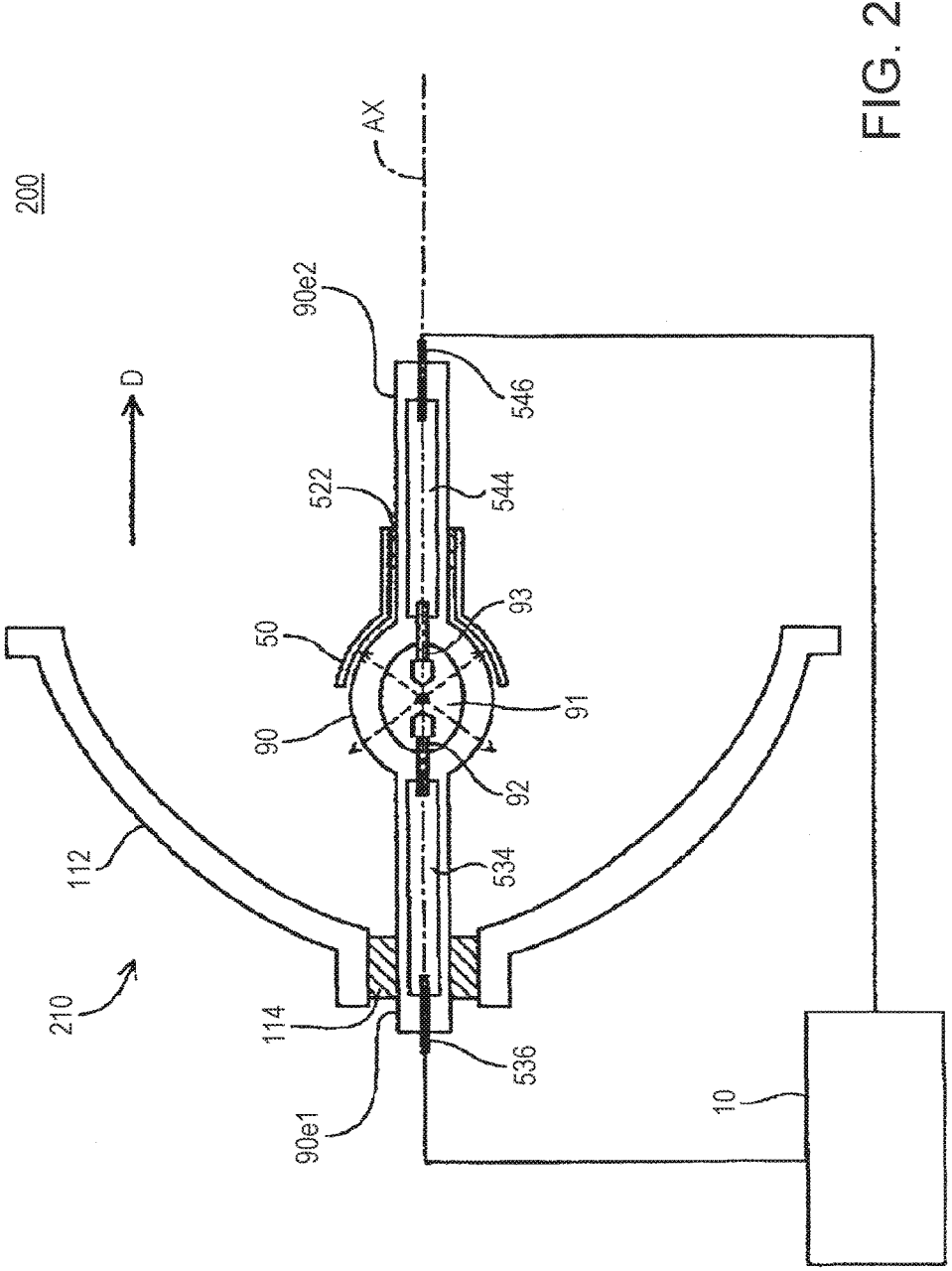
FIG. 2 is a sectional view illustrating a discharge lamp in the first embodiment.

FIG. 2 is a sectional view illustrating a configuration of the light source apparatus 200. The light source apparatus 200 includes a light source unit 210 and a discharge lamp lighting device (discharge lamp driving device) 10. FIG. 2 shows a sectional view of the light source unit 210. The light source unit 210 includes a main reflection mirror 112, a discharge lamp 90, and a subsidiary reflection mirror 50.

The discharge lamp lighting device 10 supplies a driving current I to the discharge lamp 90 so as to light the discharge lamp 90. The main reflection mirror 112 reflects light emitted from the discharge lamp 90 in an irradiation direction D. The irradiation direction D is parallel to an optical axis AX of the discharge lamp 90.

The discharge lamp 90 has a rod shape extending in the irradiation direction D. One end of the discharge lamp 90 is referred to as a first end 90e1, and the other end of the discharge lamp 90 is referred to as a second end 90e2. A material of the discharge lamp 90 is, for example, a light transmissive material such as quartz glass. A central portion of the discharge lamp 90 is swollen in a spherical shape, and the inside thereof is a discharge space 91. A gas which is a discharge medium containing rare gases, metal halogen compounds, and the like is enclosed in the discharge space 91.

Tips of a first electrode 92 and a second electrode 93 protrude in the discharge space 91. The first electrode 92 is disposed on the first end 90e1 side of the discharge space 91. The second electrode 93 is disposed on the second end 90e2 side of the discharge space 91. Each of the first electrode 92 and the second electrode 93 has a rod shape extending in the optical axis AX. The tips of the first electrode 92 and the second electrode 93 are disposed to face each other with a predetermined distance in the discharge space 91. A material of each of the first electrode 92 and the second electrode 93 is, for example, a metal such as tungsten.

A first terminal 536 is provided at the first end 90e1 of the discharge lamp 90. The first terminal 536 and the first electrode 92 are electrically connected to each other via a conductive member 534 which penetrates through the discharge lamp 90. Similarly, a second terminal 546 is provided at the second end 90e2 of the discharge lamp 90. The second terminal 546 and the second electrode 93 are electrically connected to each other via a conductive member 544 which penetrates through the discharge lamp 90. A material of each of the first terminal 536 and the second terminal 546 is, for example, a metal such as tungsten. As a material of each of the conductive members 534 and 544, for example, a molybdenum foil is used.

The first terminal 536 and the second terminal 546 are connected to the discharge lamp lighting device 10. The discharge lamp lighting device 10 supplies the driving current I for driving the discharge lamp 90 to the first terminal 536 and the second terminal 546. As a result, arc discharge occurs between the first electrode 92 and the second electrode 93. Light (discharge light) occurring due to the arc discharge is radiated in all directions from the discharge position as indicated by dashed arrows.

The main reflection mirror 112 is fixed to the first end 90e1 of the discharge lamp 90 via a fixation member 114. The main reflection mirror 112 reflects light which travels toward an opposite side to the irradiation direction D among discharge light beams, in the irradiation direction D. A shape of a reflection surface (a surface on the discharge lamp 90 side) of the main reflection mirror 112 is not particularly limited within a range in which discharge light can be reflected in the irradiation direction D, and may be, for example, a spheroidal shape or a rotating parabolic shape. For example, in a case where a shape of the reflection surface of the main reflection mirror 112 is a rotating parabolic shape, the main reflection mirror 112 can convert discharge light into light which is substantially parallel to the optical axis AX. Consequently, the collimating lens 305 can be omitted.

The subsidiary reflection mirror 50 is fixed to the second end 90e2 side of the discharge lamp 90 via a fixation member 522. A shape of a reflection surface (a surface on the discharge lamp 90 side) of the subsidiary reflection mirror 50 is a spherical shape which surrounds a portion of the discharge space 91 on the second end 90e2 side. The subsidiary reflection mirror 50 reflects light which travels toward an opposite side to the side on which the main reflection mirror 112 is disposed among the discharge light beams, toward the main reflection mirror 112. Consequently, it is possible to increase usage efficiency of the light radiated from the discharge space 91.

A material of each of the fixation members 114 and 522 is not particularly limited as long as the material is a heat resistant material which can resist heat generated from the discharge lamp 90, and is, for example, an inorganic adhesive. A method of fixing the main reflection mirror 112, the subsidiary reflection mirror 50, and the discharge lamp 90 to each other is not limited to a method in which the main reflection mirror 112 and the subsidiary reflection mirror 50 are fixed to the discharge lamp 90, and may employ any method. For example, the discharge lamp 90 and the main reflection mirror 112 may be separately fixed to a casing (not illustrated) of the projector 500. This is also the same for the subsidiary reflection mirror 50.

Hereinafter, a circuit configuration of the projector 500 will be described.

Figure 3:
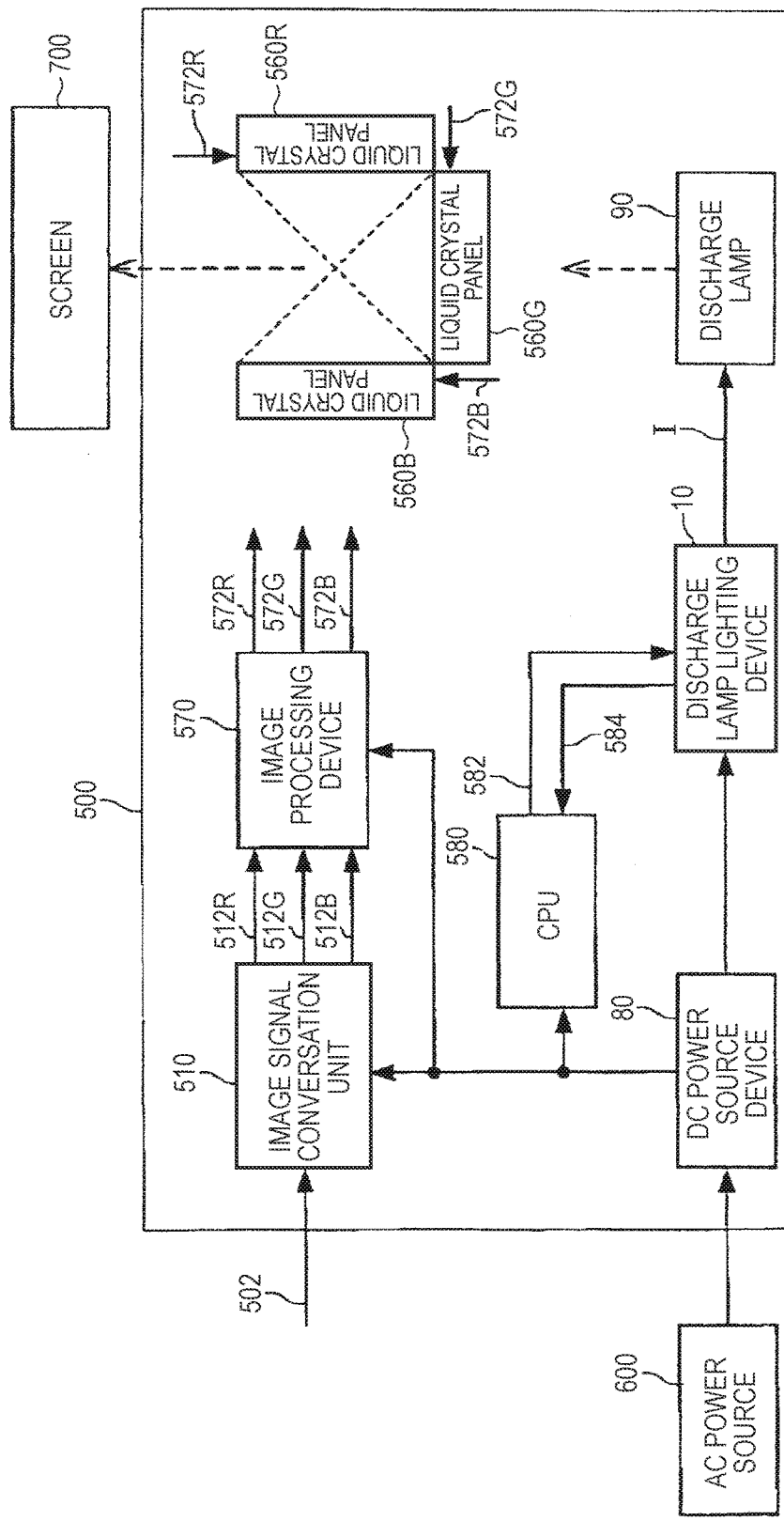
FIG. 3 is a block diagram illustrating various constituent elements of the projector according to the first embodiment.

FIG. 3 is a diagram illustrating an example of a circuit configuration of the projector 500 according to the present embodiment. The projector 500 includes an image signal conversion unit 510, a DC power source device 80, the liquid crystal panels 560R, 560G and 560B, an image processing device 570, and a central processing unit (CPU) 580, in addition to the optical systems illustrated in FIG. 1.

The image signal conversion unit 510 converts image signals 502 (luminance-color difference signals, analog RGB signals, or the like) which are input from an external device into digital RGB signals with a predetermined word length so as to generate image signals 512R, 512G and 512B which are then supplied to the image processing device 570.

The image processing device 570 performs an image process on each of the three image signals 512R, 512G and 512B. The image processing device 570 supplies driving signals 572R, 572G and 572B for respectively driving the liquid crystal panels 560R, 560G and 560B, to the liquid crystal panels 560R, 560G and 560B.

The DC power source device 80 converts an AC voltage supplied from an external AC power source 600 into a constant DC voltage. The DC power source device 80 supplies DC voltages to the image signal conversion unit 510 and the image processing device 570 located on a secondary side of a transformer (not illustrated but included in the DC power source device 80) and the discharge lamp lighting device 10 located on a primary side of the transformer.

The discharge lamp lighting device 10 generates a high voltage between the electrodes of the discharge lamp 90 so as to cause dielectric breakdown and thus to form a discharge path during activation. Thereafter, the discharge lamp lighting device 10 supplies the driving current I for the discharge lamp 90 maintaining discharge.

The liquid crystal panels 560R, 560G and 560B are respectively provided in the above-described liquid crystal light valves 330R, 330G and 330B. The liquid crystal panels 560R, 560G and 560B modulate transmittance (luminance) of the color light beams which are respectively incident on the liquid crystal panels 560R, 560G and 560B via the above-described optical systems on the basis of the respective driving signals 572R, 572G and 572B.

The CPU 580 controls various operations from starting of lighting of the projector 500 to putting-out thereof. For example, in the example illustrated in FIG. 3, a lighting command or a putting-out command is output to the discharge lamp lighting device 10 via a communication signal 582. The CPU 580 receives lighting information of the discharge lamp 90 from the discharge lamp lighting device 10 via a communication signal 584.

Hereinafter, a description will be made of a configuration of the discharge lamp lighting device 10.

Figure 4:
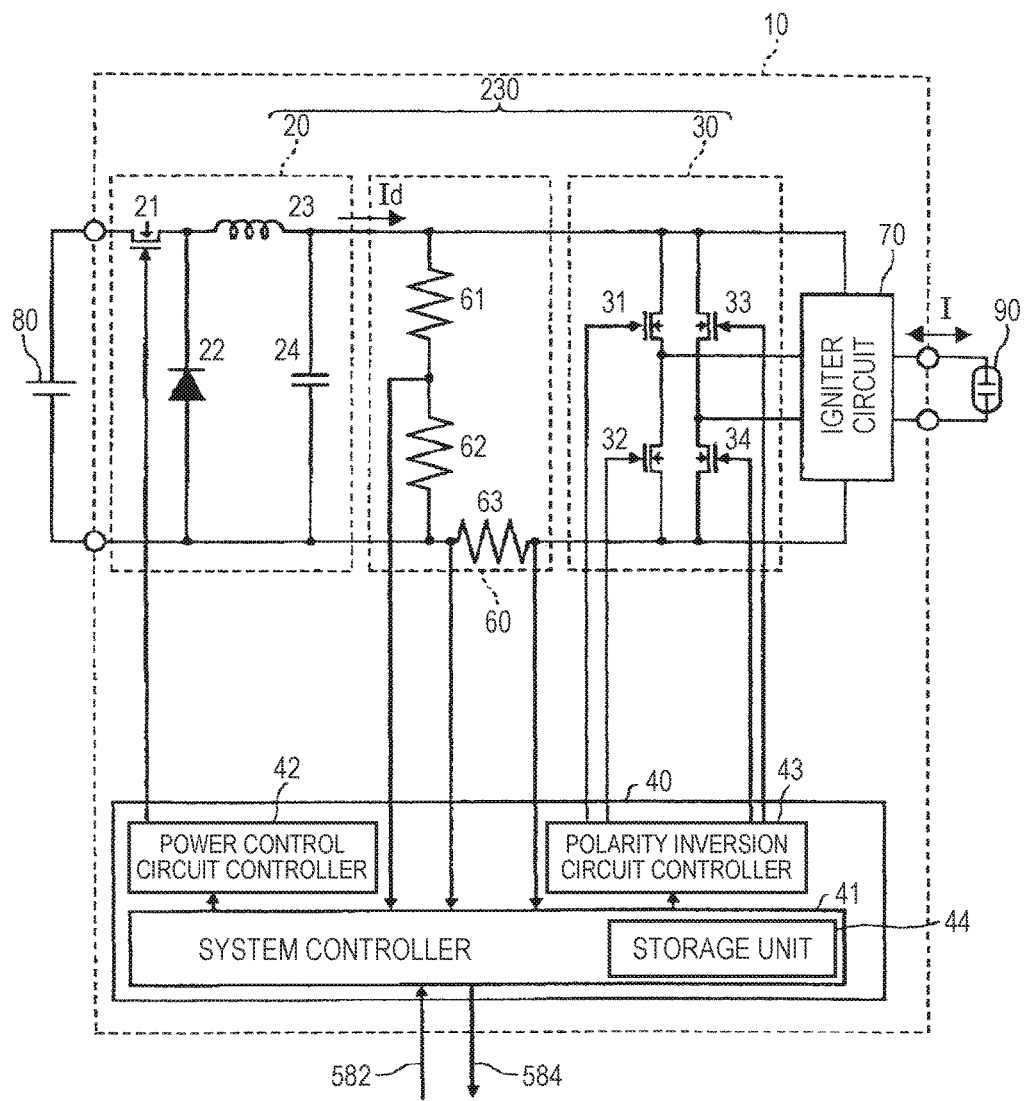
FIG. 4 is a circuit diagram illustrating a discharge lamp lighting device according to the first embodiment.

FIG. 4 is a diagram illustrating an example of a circuit configuration of the discharge lamp lighting device 10.

The discharge lamp lighting device 10 includes, as illustrated in FIG. 4, a power control circuit 20, a polarity inversion circuit 30, a controller 40, an operation detection unit 60, and an igniter circuit 70.

The power control circuit 20 generates driving power which is supplied to the discharge lamp 90. In the present embodiment, the power control circuit 20 is constituted of a down chopper circuit which receives a voltage from the DC power source device 80 and outputs a DC current Id by stepping down the input voltage.

The power control circuit 20 is configured to include a switch element 21, a diode 22, a coil 23, and a capacitor 24. The switch element 21 is constituted of, for example, a transistor. In the present embodiment, one end of the switch element 21 is connected to a positive voltage side of the DC power source device 80, and the other end thereof is connected to a cathode terminal of the diode 22 and one end of the coil 23.

One end of the capacitor 24 is connected to the other end of the coil 23, and the other end of the capacitor 24 is connected to an anode terminal of the diode 22 and a negative voltage side of the DC power source device 80. A current control signal is input to a control terminal of the switch element 21 from the controller 40 which will be described later, and thus turning-on and turning-off of the switch element 21 are controlled. As the current control signal, for example, a pulse width modulation (PWM) control signal may be used.

If the switch element 21 is turned on, a current flows through the coil 23, and thus energy is accumulated in the coil 23. Thereafter, if the switch element 21 is turned off, the energy accumulated in the coil 23 is released along a path passing through the capacitor 24 and the diode 22. As a result, the DC current Id is generated which is proportional to a time period in which the switch element 21 is turned on.

The polarity inversion circuit 30 inverts a polarity of the DC current Id which is input from the power control circuit 20, at a predetermined timing. Consequently, the polarity inversion circuit 30 generates and outputs a driving current I as a DC which is continuously maintained only for a controlled time period, or a driving current I as an AC which has any frequency. In the present embodiment, the polarity inversion circuit 30 is constituted of an inverter bridge circuit (full bridge circuit).

The polarity inversion circuit 30 includes, for example, a first switch element 31, a second switch element 32, a third switch element 33, and a fourth switch element 34, constituted of transistors. The polarity inversion circuit 30 has a configuration in which the first switch element 31 and the second switch element 32 which are connected in series to each other are connected in parallel to the third switch element 33 and the fourth switch element 34 which are connected in series to each other. A polarity inversion control signal is input from the controller 40 to each of control terminals of the first switch element 31, the second switch element 32, the third switch element 33, and the fourth switch element 34. Turning-on and turning-off operations of each of the first switch element 31, the second switch element 32, the third switch element 33, and the fourth switch element 34 are controlled on the basis of the polarity inversion control signal.

In the polarity inversion circuit 30, an operation is repeatedly performed in which the first switch element 31 and the fourth switch element 34, and the second switch element 32 and the third switch element 33 are alternately turned on or off. Therefore, the polarities of the DC current Id output from the power control circuit 20 are alternately inverted. The polarity inversion circuit 30 generates and outputs a driving current I as a DC which is continuously maintained in the same polarity state only for a controlled time period or a driving current I as an AC having a controlled frequency, from a common connection point between the first switch element 31 and the second switch element 32, and a common connection point between the third switch element 33 and the fourth switch element 34.

In other words, in the polarity inversion circuit 30, the second switch element 32 and the third switch element 33 are controlled to be turned off when the first switch element 31 and the fourth switch element 34 are turned on, and the second switch element 32 and the third switch element 33 are controlled to be turned on when the first switch element 31 and the fourth switch element 34 are turned off. Thus, the driving current I is generated which flows in order of the first switch element 31, the discharge lamp 90, and the fourth switch element 34 from one end of the capacitor 24 when the first switch element 31 and the fourth switch element 34 are turned on. The driving current I is generated which flows in order of the third switch element 33, the discharge lamp 90, and the second switch element 32 from one end of the capacitor 24 when the second switch element 32 and the third switch element 33 are turned on.

In the present embodiment, the portion including the power control circuit 20 and the polarity inversion circuit 30 corresponds to a discharge lamp driving unit 230. In other words, the discharge lamp driving unit 230 supplies the driving current I for driving the discharge lamp 90 to the discharge lamp 90.

The controller 40 controls the discharge lamp driving unit 230. In the example illustrated in FIG. 4, the controller 40 controls the power control circuit 20 and the polarity inversion circuit 30 so as to control parameters such as duration in which the driving current I is continuously maintained to have the same polarity, and a current value (a power value of driving power) and a frequency of the driving current I. The controller 40 performs polarity inversion control for controlling the duration in which the driving current I is continuously maintained to have the same polarity, a frequency of the driving current I, and the like, on the polarity inversion circuit 30, on the basis of a polarity inversion timing of the driving current I. The controller 40 performs current control for controlling a current value of the output DC current Id on the power control circuit 20.

A configuration of the controller 40 is not particularly limited. In the present embodiment, the controller 40 is configured to include a system controller 41, a power control circuit controller 42, and a polarity inversion circuit controller 43. Some or all of the controllers of the controller 40 may be configured by using semiconductor integrated circuits.

The system controller 41 controls the power control circuit controller 42 and the polarity inversion circuit controller 43 so as to control the power control circuit 20 and the polarity inversion circuit 30. The system controller 41 may control the power control circuit controller 42 and the polarity inversion circuit controller 43 on the basis of a lamp voltage Vla and a driving current I detected by the operation detection unit 60.

In the present embodiment, the system controller 41 is connected to a storage unit 44.

The system controller 41 may control the power control circuit 20 and the polarity inversion circuit 30 on the basis of information stored in the storage unit 44. The storage unit 44 may store, for example, information regarding driving parameters such as the duration in which the driving current I is continuously maintained to have the same polarity, a current value, a frequency, a waveform, and a modulation pattern of the driving current I.

The power control circuit controller 42 outputs a current control signal to the power control circuit 20 on the basis of a control signal from the system controller 41, so as to control the power control circuit 20.

The polarity inversion circuit controller 43 outputs a polarity inversion control signal to the polarity inversion circuit 30 on the basis of a control signal from the system controller 41, so as to control the polarity inversion circuit 30.

The controller 40 may be implemented by using a dedicated circuit so as to perform the above-described control or various control operations related to processes to be described later. In contrast, the controller 40 functions as a computer, for example, by the CPU executing a control program stored in the storage unit 44, so as to perform various control operations related to such processes.

Figure 5:
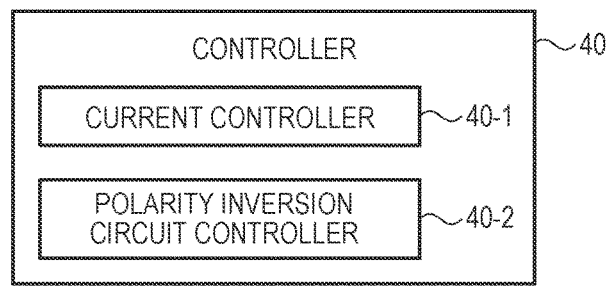
FIG. 5 is a block diagram illustrating a configuration example of a controller according to the first embodiment.

FIG. 5 is a diagram illustrating another configuration example of the controller 40. As illustrated in FIG. 5, the controller 40 may be configured to function as a current controller 40-1 which controls the power control circuit 20 and a polarity inversion circuit controller 40-2 which controls the polarity inversion circuit 30 according to the control program.

In the example illustrated in FIG. 4, the controller 40 is configured as apart of the discharge lamp lighting device 10. In contrast, the CPU 580 may be configured to realize some of the functions of the controller 40.

In the present embodiment, the operation detection unit 60 includes a voltage detection portion which detects the lamp voltage Vla of the discharge lamp 90 and outputs lamp voltage information to the controller 40. The operation detection unit 60 may include a current detection portion or the like which detects the driving current I and outputs driving current information to the controller 40. In the present embodiment, the operation detection unit 60 is configured to include a first resistor 61, a second resistor 62, and a third resistor 63.

In the present embodiment, the voltage detection portion of the operation detection unit 60 detects the lamp voltage Vla on the basis of a voltage divided by the first resistor 61 and the second resistor 62 which are connected in parallel to the discharge lamp 90 and are connected in series to each other. In addition, in the present embodiment, the current detection portion detects the driving current I on the basis of a voltage occurring at the third resistor 63 which is connected in series to the discharge lamp 90.

The igniter circuit 70 operates only at the time of starting of lighting of the discharge lamp 90. The igniter circuit 70, when starting lighting of the discharge lamp 90, supplies a high voltage (a voltage higher than at normal lighting of the discharge lamp 90) which is necessary to cause dielectric breakdown between the electrodes (between the first electrode 92 and the second electrode 93) of the discharge lamp 90 and thus to form a discharge path, between the electrodes of the discharge lamp 90 (between the first electrode 92 and the second electrode 93). In the present embodiment, the igniter circuit 70 is connected in parallel to the discharge lamp 90.

Figures 6A, 6B:
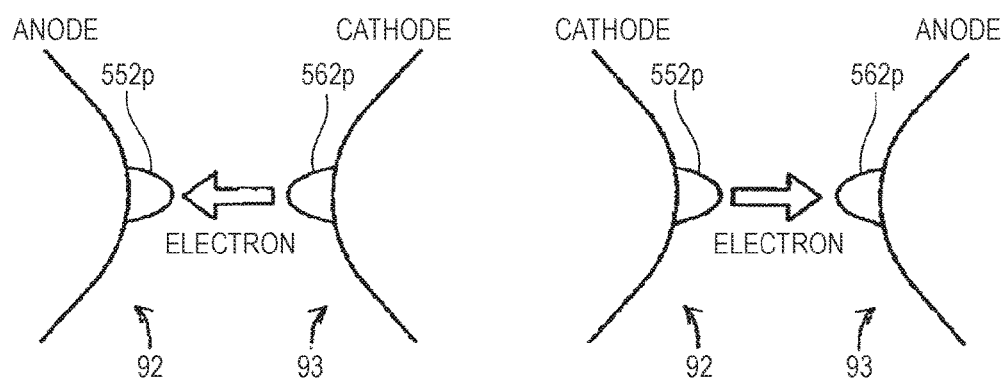
FIGS. 6A and 6B are diagrams illustrating states of protrusions of electrode tips of the discharge lamp.

FIGS. 6A and 6B illustrate the tips of the first electrode 92 and the second electrode 93. Protrusions 552p and 562p are respectively formed at the tips of the first electrode 92 and the second electrode 93. Discharge occurring between the first electrode 92 and the second electrode 93 mainly occurs between the protrusion 552p and the protrusion 562p. In a case where the protrusions 552p and 562p are provided as in the present embodiment, movements of discharge positions (arc positions) at the first electrode 92 and the second electrode 93 can be minimized compared with a case where no protrusions are provided.

FIG. 6A illustrates a first polarity state in which the first electrode 92 operates as an anode, and the second electrode 93 operates as a cathode. In the first polarity state, electrons move from the second electrode 93 (cathode) to the first electrode 92 (anode) due to discharge. The electrons are emitted from the cathode (second electrode 93). The electrons emitted from the cathode (second electrode 93) collide with the tip of the anode (first electrode 92). Heat is generated due to the collision, and thus the temperature of the tip (protrusion 552p) of the anode (first electrode 92) increases.

FIG. 6B illustrates a second polarity state in which the first electrode 92 operates as a cathode, and the second electrode 93 operates as an anode. Contrary to the first polarity state, in the second polarity state, electrons move from the first electrode 92 to the second electrode 93. As a result, a temperature of the tip (protrusion 562p) of the second electrode 93 increases.

As mentioned above, when the driving current I is supplied to the discharge lamp 90, the temperature of the anode with which the electrons collide increases. On the other hand, the temperature of the cathode which emits the electrons decreases during emission of the electrons toward the anode.

A distance between the first electrode 92 and the second electrode 93 is lengthened according to deterioration of the protrusions 552p and 562p. This is because the protrusions 552p and 562p are depleted. If the distance between the electrodes is lengthened, resistance between the first electrode 92 and the second electrode 93 is increased, and thus the lamp voltage Vla is increased. Therefore, by referring to the lamp voltage Vla, it is possible to detect a change in the distance between the electrodes, that is, the extent of deterioration of the discharge lamp 90.

The first electrode 92 and the second electrode 93 have the same configuration, and thus only the first electrode 92 will be described as a representative thereof in some cases in the following description. In addition, the protrusion 552p of the tip of the first electrode 92 and the protrusion 562p of the tip of the second electrode 93 have the same configuration, and thus only the protrusion 552p will be described as a representative thereof in some cases in the following description.

Next, a detailed description will be made of control of the discharge lamp driving unit 230 performed by the controller 40. The controller 40 controls the discharge lamp driving unit 230 so that a first driving current which causes the first electrode 92 to serve as an anode and a second driving current which causes the second electrode 93 to serve as an anode are alternately supplied to the discharge lamp 90. In other words, the driving current I includes the first driving current and the second driving current. The first driving current is the driving current I which causes the second electrode 93 to serve as a cathode, and the second driving current is the driving current I which causes the first electrode 92 to serve as a cathode.

Figure 7:
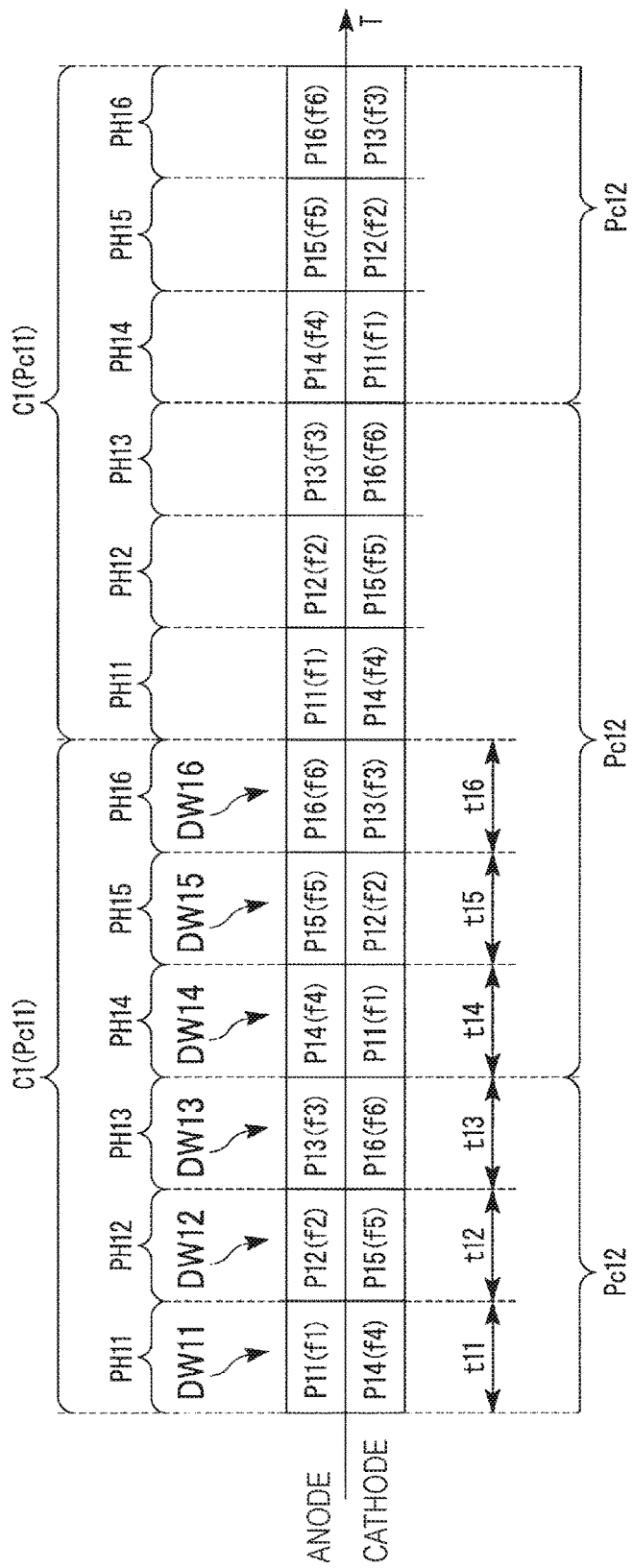
FIG. 7 is a diagram illustrating a frequency change in the first embodiment.

FIG. 7 is a diagram illustrating a frequency change of the driving current I according to the present embodiment. In FIG. 7, a transverse axis expresses time T. In FIG. 7, a first pattern Pc11 of the driving current I which causes the first electrode 92 to serve as an anode, that is, the first driving current is illustrated on the upper part, and a second pattern Pc12 of the driving current I which causes the first electrode 92 to serve as a cathode, that is, the second driving current is illustrated on the lower part.

As illustrated in FIG. 7, the controller 40 controls the discharge lamp driving unit 230 so that a frequency of the first driving current changes according to the periodic first pattern Pc11, and a frequency of the second driving current changes according to the periodic second pattern Pc12. Here, the frequency of each driving current means the inverse of the period over which that driving current is supplied to the discharge lamp. The overall alternating current supplied to the discharge lamp is made up of alternating periods of the first driving current and the second driving current, and each period may have a different length corresponding to a different frequency. In the present embodiment, the first pattern Pc11 and the second pattern Pc12 include a frequency period P11 in which a frequency is f1, a frequency period P12 in which a frequency is f2, a frequency period P13 in which a frequency is f3, a frequency period P14 in which a frequency is f4, a frequency period P15 in which a frequency is f5, and a frequency period P16 in which a frequency is f6 in this order. In other words, the first pattern Pc11 and the second pattern Pc12 include a plurality of frequency periods in which frequencies of the driving current I are different from each other. A frequency in each frequency period is maintained to be constant.

The frequency f1, the frequency f2, the frequency f3, the frequency f4, the frequency f5, and the frequency f6 increase in this order. In other words, the first pattern Pc11 and the second pattern Pc12 are patterns in which frequencies of the driving current I increase. In the present embodiment, the first pattern Pc11 and the second pattern Pc12 are, for example, the same pattern.

In the present embodiment, the frequencies f1 to f6 of the driving current I in the frequency periods P11 to P16 increase geometrically for each frequency period, for example. In other words, the frequency f2 is obtained by multiplying the frequency f1 by a predetermined value; the frequency f3 is obtained by multiplying the frequency f2 by the predetermined value; the frequency f4 is obtained by multiplying the frequency f3 by the predetermined value; the frequency f5 is obtained by multiplying the frequency f4 by the predetermined value; and the frequency f6 is obtained by multiplying the frequency f5 by the predetermined value.

The predetermined value is, for example, greater than 1 and about 1.5 or less. Through the above-described setting, a difference between the frequencies can be appropriately set in the first pattern Pc11 and the second pattern Pc12. Consequently, the protrusion 552p of the first electrode 92 can be appropriately melted at a relatively low frequency, and the melted protrusion 552p can be caused to grow at a relatively high frequency. Therefore, a shape of the protrusion 552p can be easily and more stably maintained.

An upper limit value of the frequency, that is, a value of the frequency f6 in the example shown in the present embodiment may be set, for example, according to a value of driving power which is supplied to the discharge lamp 90. If a frequency is set to a relatively high value when the driving power is relatively large, oscillation energy due to an alternating current (AC) increases, and thus there is a concern that the first electrode 92 and the second electrode 93 may be damaged. For this reason, the upper limit value of the frequency is decreased as the driving power becomes larger, and the upper limit value thereof is increased as the driving power becomes smaller. Thus, it is possible to prevent the discharge lamp lighting device 10 from being damaged.

The frequencies of the first pattern Pc11 and the second pattern Pc12 change, for example, in the range from about 10 Hz to about 5 kHz.

In the present embodiment, a length t11 of the frequency period P11, a length t12 of the frequency period P12, a length t13 of the frequency period P13, a length t14 of the frequency period P14, a length t15 of the frequency period P15, and a length t16 of the frequency period P16 are the same as each other, for example. Each of the lengths t11 to t16 of the respective frequency periods P11 to P16 is, for example, 0.5 seconds (s) or more and 60 seconds (s) or less.

The cycle of the first pattern Pc11 and the cycle of the second pattern Pc12 are phase-shifted relative to each other. In the present embodiment, the cycle of the first pattern Pc11 is phase-shifted relative to the cycle of the second pattern Pc12, for example, by a half cycle. In the present embodiment, since each of the first pattern Pc11 and the second pattern Pc12 have six frequency periods of the same length, the cycle of the first pattern Pc11 and the cycle of the second pattern Pc12 are phase-shifted relative to each other by three frequency periods. Specifically, in the present embodiment, the frequency period P11 which is an initial frequency period of the second pattern Pc12 is provided at the same timing as that of the frequency period P14 of the first pattern Pc11.

Consequently, each frequency period of the first pattern Pc11 and each frequency period of the second pattern Pc12 are phase-shifted relative to and combined with each other, so as to form a first AC period PH11, a second AC period PH12, a third AC period PH13, a fourth AC period PH14, a fifth AC period PH15, and a sixth AC period PH16. In the present embodiment, the driving current I has a plurality of continuous cycles C1 each containing the first AC period PH11 to the sixth AC period PH16.

In the present embodiment, since the lengths of the respective frequency periods are the same as each other, the length of each of the AC periods is the same as the length of the frequency period, and the lengths of the respective AC periods are the same as each other.

Figure 8A:
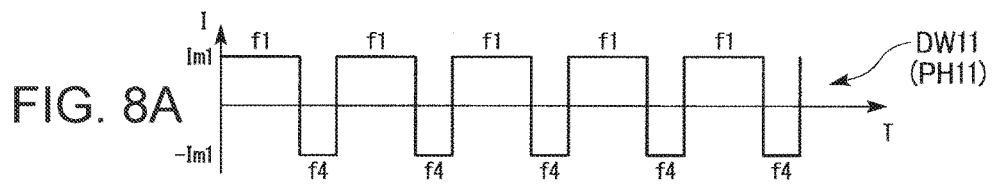
FIGS. 8A to 8F are diagrams illustrating driving current waveforms according to the first embodiment.
Figure 8B:
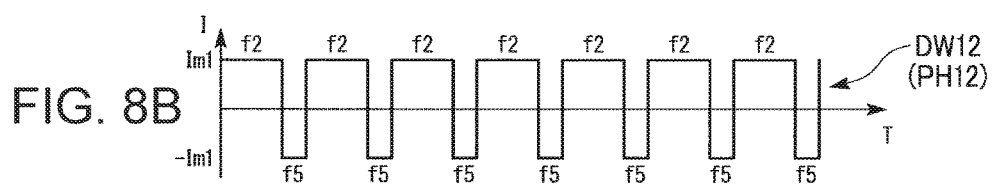
Figure 8C:
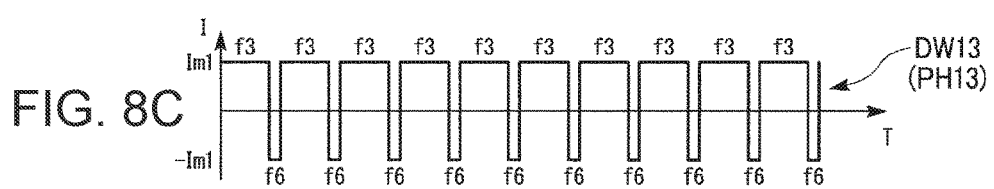
Figure 8D:
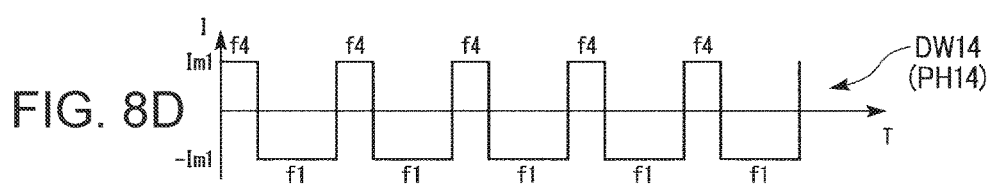
Figure 8E:
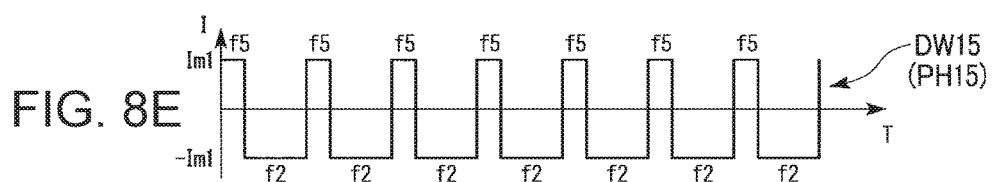
Figure 8F:
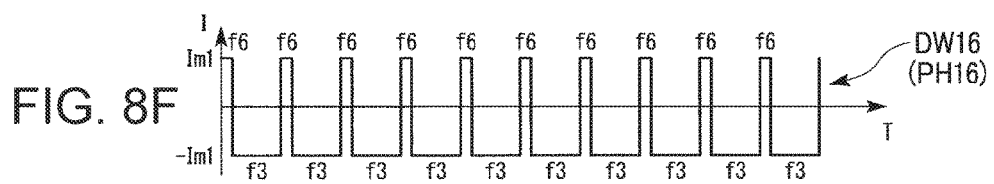

FIGS. 8A to 8F are diagrams illustrating driving current waveforms in the respective AC periods. FIG. 8A is a diagram illustrating a driving current waveform DW11 in the first AC period PH11. FIG. 8B is a diagram illustrating a driving current waveform DW12 in the second AC period PH12. FIG. 8C is a diagram illustrating a driving current waveform DW13 in the third AC period PH13. FIG. 8D is a diagram illustrating a driving current waveform DW14 in the fourth AC period PH14. FIG. 8E is a diagram illustrating a driving current waveform DW15 in the fifth AC period PH15. FIG. 8F is a diagram illustrating a driving current waveform DW16 in the sixth AC period PH16. Each of the AC periods PH11 to PH16 is formed of a period in which an alternating current having a plurality of cycles is supplied to the discharge lamp 90.

In each of FIGS. 8A to 8F, a longitudinal axis expresses the driving current I, and a transverse axis expresses time T. In FIGS. 8A to 8F, the driving current I is illustrated to be positive in a case of the first polarity state and is illustrated to be negative in a case of the second polarity state. This is also the same for FIGS. 12A to 12F which will be described later.

As illustrated in FIGS. 8A to 8F, an alternating current whose polarity is inverted between a current value Im1 and a current value −Im1 is supplied to the discharge lamp 90 as the driving current I in the driving current waveforms DW11 to DW16.

As illustrated in FIGS. 7 and 8A, the driving current waveform DW11 is formed of the frequency period P11 of the first pattern Pc11 in which the frequency is f1 and the frequency period P14 of the second pattern Pc12 in which the frequency is f4. In other words, in the driving current waveform DW11, a frequency in the first polarity state is f1, and a frequency in the second polarity state is f4.

As illustrated in FIGS. 7 and 8B, the driving current waveform DW12 is formed of the frequency period P12 of the first pattern Pc11 in which the frequency is f2 and the frequency period P15 of the second pattern Pc12 in which the frequency is f5. In other words, in the driving current waveform DW12, a frequency in the first polarity state is f2, and a frequency in the second polarity state is f5.

As illustrated in FIGS. 7 and 8C, the driving current waveform DW13 is formed of the frequency period P13 of the first pattern Pc11 in which the frequency is f3 and the frequency period P16 of the second pattern Pc12 in which the frequency is f6. In other words, in the driving current waveform DW13, a frequency in the first polarity state is f3, and a frequency in the second polarity state is f6.

As illustrated in FIGS. 7 and 8D, the driving current waveform DW14 is formed of the frequency period P14 of the first pattern Pc11 in which the frequency is f4 and the frequency period P11 of the second pattern Pc12 in which the frequency is f1. In other words, in the driving current waveform DW14, a frequency in the first polarity state is f4, and a frequency in the second polarity state is f1.

As illustrated in FIGS. 7 and 8E, the driving current waveform DW15 is formed of the frequency period P15 of the first pattern Pc11 in which the frequency is f5 and the frequency period P12 of the second pattern Pc12 in which the frequency is f2. In other words, in the driving current waveform DW15, a frequency in the first polarity state is f5, and a frequency in the second polarity state is f2.

As illustrated in FIGS. 7 and 8F, the driving current waveform DW16 is formed of the frequency period P16 of the first pattern Pc11 in which the frequency is f6 and the frequency period P13 of the second pattern Pc12 in which the frequency is f3. In other words, in the driving current waveform DW16, a frequency in the first polarity state is f6, and a frequency in the second polarity state is f3.

The driving current waveform DW14 is a waveform obtained by inverting the polarity of the driving current waveform DW11. The driving current waveform DW15 is a waveform obtained by inverting the polarity of the driving current waveform DW12. The driving current waveform DW16 is a waveform obtained by inverting the polarity of the driving current waveform DW13.

The control performed by the controller 40 may be expressed as a discharge lamp driving method. In other words, there is provided a discharge lamp driving method according to the present embodiment in which the driving current I is supplied to the discharge lamp 90 including the first electrode 92 and the second electrode 93 in order to drive the discharge lamp 90, the driving current I including the first driving current which causes the first electrode 92 to serve as an anode and the second driving current which causes the second electrode 93 to serve as an anode, the method including alternately supplying the first driving current and the second driving current to the discharge lamp 90; changing a frequency of the first driving current according to the periodic first pattern Pc11 and changing a frequency of the second driving current according to the periodic second pattern Pc12, the first pattern Pc11 and the second pattern Pc12 being patterns in which a frequency of the driving current I increases; and deviating a cycle of the first pattern Pc11 and a cycle of the second pattern Pc12 relative to each other.

For example, at a relatively low frequency, a heat load applied to the protrusion 552p of the first electrode 92 is relatively considerable, and the protrusion 552p is easily melted. On the other hand, at a relatively high frequency, a heat load applied to the protrusion 552p of the first electrode 92 is relatively slight, and the melted protrusion 552p is easily coagulated and grows.

Therefore, according to the present embodiment, the first pattern Pc11 and the second pattern Pc12 are patterns in which a frequency of the driving current I increases. For this reason, the protrusion 552p of the first electrode 92 is easily melted at a relatively low frequency, and then the protrusion 552p is easily coagulated and grows at a relatively high frequency.

A range of the protrusion 552p of the first electrode 92 being melted is relatively wide at a relatively low frequency, and a range of the protrusion 552p of the first electrode 92 being melted is relatively narrow at a relatively high frequency. Therefore, the melted protrusion 552p is coagulated at a location where the protrusion 552p is not melted at the relatively high frequency.

According to the present embodiment, since the cycle of the first pattern Pc11 and the cycle of the second pattern Pc12 are phase-shifted relative to each other, a shape of the protrusion 552p of the first electrode 92 can be stably maintained. Details thereof will now be described.

Figure 11:
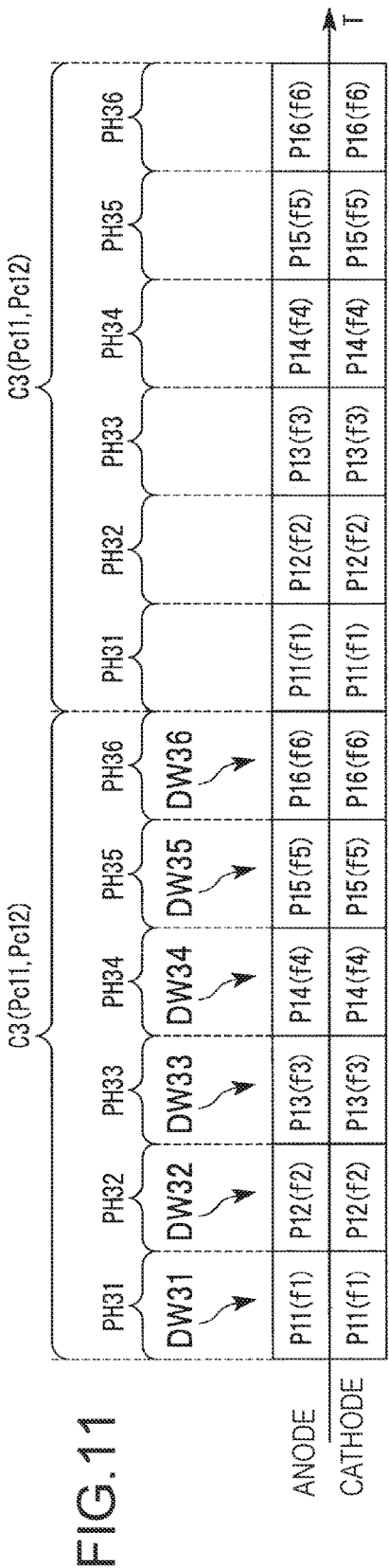
FIG. 11 is a diagram illustrating a frequency change in a comparative example.

First, a comparative example will be described. FIG. 11 is a diagram illustrating a frequency change of a driving current I in the comparative example. In FIG. 11, a transverse axis expresses time T. In FIG. 11, the first pattern Pc11 is illustrated on an upper part, and the second pattern Pc12 is illustrated on a lower part. In the following description, the same configuration as described above is given the same reference numeral as appropriate, and description thereof will be omitted in some cases.

As illustrated in FIG. 11, in the comparative example, the cycle of the first pattern Pc11 matches the cycle of the second pattern Pc12. In other words, in the comparative example, the frequency period P11 which is an initial frequency period of the second pattern Pc12 is provided at the same timing as that of the frequency period P11 which is an initial frequency period of the first pattern Pc11.

Consequently, each frequency period of the first pattern Pc11 and each frequency period of the second pattern Pc12 match and are combined with each other, so as to form a first AC period PH31, a second AC period PH32, a third AC period PH33, a fourth AC period PH34, a fifth AC period PH35, and a sixth AC period PH36. In the comparative example, the driving current I has a plurality of continuous cycles C3 each containing the first AC period PH31 to the sixth AC period PH36.

FIGS. 12A to 12F are diagrams illustrating driving current waveforms in the respective AC periods in the comparative example. FIG. 12A is a diagram illustrating a driving current waveform DW31 in the first AC period PH31. FIG. 12B is a diagram illustrating a driving current waveform DW32 in the second AC period PH32. FIG. 12C is a diagram illustrating a driving current waveform DW33 in the third AC period PH33. FIG. 12D is a diagram illustrating a driving current waveform DW34 in the fourth AC period PH34. FIG. 12E is a diagram illustrating a driving current waveform DW35 in the fifth AC period PH35. FIG. 12F is a diagram illustrating a driving current waveform DW36 in the sixth AC period PH36.

As illustrated in FIGS. 12A to 12F, an alternating current whose polarity is inverted between a current value Im1 and a current value −Im1 is supplied to the discharge lamp 90 as the driving current I in the driving current waveforms DW31 to DW36.

In the comparative example, the frequency in the first pattern Pc11 is the same as the frequency in the second pattern Pc12 in each AC period. In other words, as illustrated in FIG. 12A, the driving current waveform DW31 is a waveform of the alternating current with the frequency f1. As illustrated in FIG. 12B, the driving current waveform DW32 is a waveform of the alternating current with the frequency f2. As illustrated in FIG. 12C, the driving current waveform DW33 is a waveform of the alternating current with the frequency f3. As illustrated in FIG. 12D, the driving current waveform DW34 is a waveform of the alternating current with the frequency f4. As illustrated in FIG. 12E, the driving current waveform DW35 is a waveform of the alternating current with the frequency f5. As illustrated in FIG. 12F, the driving current waveform DW36 is a waveform of the alternating current with the frequency f6.

Figure 9A:
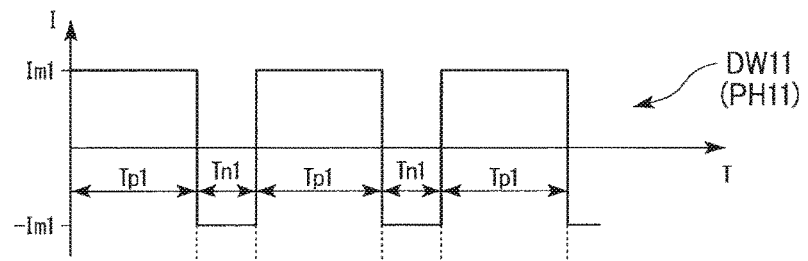
FIGS. 9A to 9C are diagrams for explaining changes in temperature of the electrode.
Figure 9B:
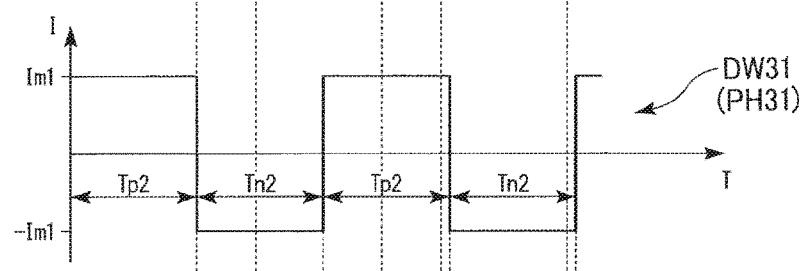
Figure 9C:
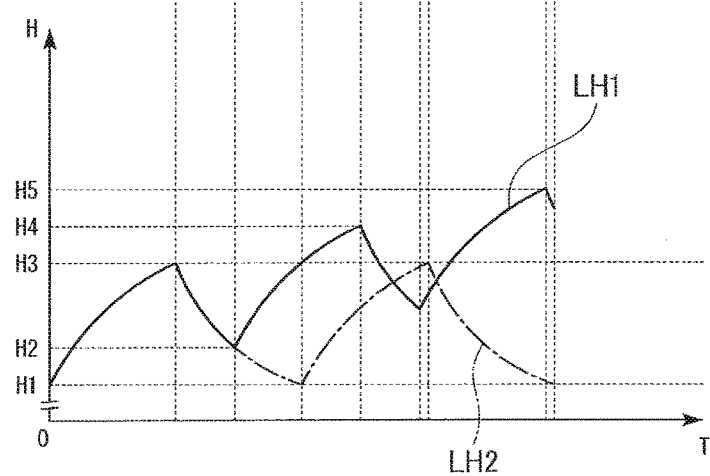

Next, a description will be made of changes in the temperature of the first electrode 92 in the present embodiment and the comparative example. FIGS. 9A to 9C are diagrams for explaining changes in the temperature of the first electrode 92. FIGS. 9A and 9B are diagrams illustrating the driving current I which is supplied to the discharge lamp 90. In FIGS. 9A and 9B, a longitudinal axis expresses the driving current I, and a transverse axis expresses time T. FIG. 9A illustrates the driving current waveform DW11 of the first AC period PH11 according to the present embodiment. FIG. 9B illustrates the driving current waveform DW31 of the first AC period PH31 according to the comparative example.

FIG. 9C is a diagram illustrating a change in the temperature of the first electrode 92 when the driving current I illustrated in FIGS. 9A and 9B is supplied to the discharge lamp 90. In FIG. 9C, a transverse axis expresses time T, and a longitudinal axis expresses a temperature H. A waveform LH1 indicates a change in the temperature of the first electrode 92 in the present embodiment. A waveform LH2 indicates a change in the temperature of the first electrode 92 in the comparative example.

As illustrated in FIGS. 9A to 9C, the temperature H of the first electrode 92 increases in a state in which the first electrode 92 serves as an anode (first polarity state), and decreases in a state in which the first electrode 92 serves as a cathode (second polarity state).

As illustrated in FIGS. 9B and 9C, in the comparative example, the temperature H of the first electrode 92 increases to H3 from H1 in a period in which the first driving current is supplied to the discharge lamp 90, that is, in a first polarity period Tp2 in which the first polarity state is sustained. In addition, the temperature H of the first electrode 92 decreases again to H1 from H3 in a period in which the second driving current is supplied to the discharge lamp 90, that is, in a second polarity period Tn2 in which the second polarity state is sustained.

As mentioned above, in the comparative example, since the cycle of the first pattern Pc11 matches the cycle of the second pattern Pc12, a length of the first polarity period Tp2 becomes equal to a length of the second polarity period Tn2, and thus the temperature H of the first electrode 92 decreases in the second polarity period Tn2 only by the increasing amount in the first polarity period Tp2.

Consequently, the temperature H of the first electrode 92 repeatedly increases and decreases within a predetermined temperature range, for example, between H1 and H3 in the example illustrated in FIG. 9C. Therefore, in the comparative example, the temperature H of the first electrode 92 does not increase over H3, and thus there is a case where the protrusion 552p of the first electrode 92 may not be sufficiently melted. As a result, there is a case where a shape of the protrusion 552p may not be stably maintained.

In contrast, in the present embodiment, as illustrated in FIG. 9A, since the cycle of the first pattern Pc11 is phase-shifted relative to the cycle of the second pattern Pc12, a length of the first polarity period Tp1 is different from a length of the second polarity period Tn1. Thus, for example, as illustrated in FIG. 9C, the temperature H of the first electrode 92 which increases up to H3 in the first polarity period Tp1 just decreases to H2 higher than H1 in the second polarity period Tn1. In addition, the temperature H of the first electrode 92 increases up to H4 higher than H3 from H2 in the next first polarity period Tp1. Similarly, the temperature H of the first electrode 92 increases up to H5 higher than H4 in the next first polarity period Tp1.

As mentioned above, according to the present embodiment, since the temperature H of the first electrode 92 can be increased in each first polarity period Tp1, it becomes easier to relatively increase the temperature H of the first electrode 92. Consequently, the protrusion 552p of the first electrode 92 can be easily melted sufficiently, and growth of the protrusion 552p can be prompted. Therefore, according to the present embodiment, a shape of the protrusion 552p of the first electrode 92 can be stably maintained. As a result, it is possible to lengthen the life of the discharge lamp 90.

Although not illustrated, for example, in the case illustrated in FIG. 9C, a temperature of the second electrode 93 decreases in each first polarity period Tp1 in accordance with a waveform which is obtained by vertically inverting the waveform LH1. The temperature H of the first electrode 92 decreases in each second polarity period in the driving current waveform DW14 which is obtained by inverting the polarity of the driving current waveform DW11.

According to the present embodiment, the temperature H of the first electrode 92 can be made higher than in the comparative example in the first AC period PH11 to the third AC period PH13 in which the frequency of the first pattern Pc11 is relatively low, and the temperature H of the first electrode 92 can be made lower than in the comparative example in the fourth AC period PH14 to the sixth AC period PH16 in which the frequency of the first pattern Pc11 is relatively high. Consequently, a range of the protrusion 552p of the first electrode 92 being melted changes from a wider range to a narrower range in the first AC period PH11 to the sixth AC period PH16. Therefore, the protrusion 552p can be easily formed in a dome shape, and a shape of the protrusion 552p can be easily and more stably maintained.

According to the present embodiment, the cycle of the first pattern Pc11 is phase-shifted relative to the cycle of the second pattern Pc12 by a half cycle. For this reason, for example, as illustrated in FIGS. 8A to 8C, the time in which the first polarity state occurs is longer than the time in which the second polarity state occurs from the first AC period PH11 to the third AC period PH13, and thus the protrusion 552p of the first electrode 92 is easily melted. On the other hand, as illustrated in FIGS. 8D to 8F, the time in which the second polarity state occurs is longer than the time in which the first polarity state occurs from the fourth AC period PH14 to the sixth AC period PH16, and thus the protrusion 562p of the second electrode 93 is easily melted. As described above, according to the present embodiment, the protrusion 552p of the first electrode 92 and the protrusion 562p of the second electrode 93 can be alternately melted with good balance and can be caused to grow.

According to the present embodiment, the lengths of the frequency periods P11 to P16 included in the first pattern Pc11 and the second pattern Pc12 are the same as each other. For this reason, in a case where the cycle of the first pattern Pc11 and the cycle of the second pattern Pc12 are phase-shifted relative to each other, the boundaries of the frequency periods P11 to P16 of the first pattern Pc11 can be aligned with the boundaries of the frequency periods P11 to P16 of the second pattern Pc12.

Consequently, waveforms of a driving current supplied to the discharge lamp 90 can be made the same waveform in the respective periods from the first AC period PH11 to the sixth AC period PH16. Therefore, changes in temperature of the first electrode 92 and the second electrode 93 in a single AC period can be stabilized, and, as a result, the protrusion 552p of the first electrode 92 and the protrusion 562p of the second electrode 93 can be caused to grow with good balance.

According to the present embodiment, the frequencies of the driving current I in the frequency periods P11 to P16 increase geometrically for each frequency period in the first pattern Pc11. For this reason, a heat load applied to the protrusion 552p of the first electrode 92 can be more effectively changed. Thus, it is possible to further prompt growth of the protrusion 552p of the first electrode 92.

According to the present embodiment, since the first pattern Pc11 and the second pattern Pc12 are the same as each other, it is possible to cause the protrusion 552p of the first electrode 92 and the protrusion 562p of the second electrode 93 to grow with better balance.

In the present embodiment, the following configurations and methods may be employed.

In the present embodiment, the first pattern Pc11 may be different from the second pattern Pc12.

In the present embodiment, the number of frequency periods included in the first pattern Pc11 and the second pattern Pc12 may be five or less, and may be seven or more. The number of frequency periods included in the first pattern Pc11 may be different from the number of frequency periods included in the second pattern Pc12.

In the present embodiment, the cycle of the first pattern Pc11 may be phase-shifted relative to the cycle of the second pattern Pc12 by any number of frequency periods. In the present embodiment, for example, the cycle of the first pattern Pc11 may be phase-shifted relative to the cycle of the second pattern Pc12 by a single frequency period, by two frequency periods, or by four or more frequency periods. The boundaries of the frequency periods of the first pattern Pc11 may be phase-shifted relative to the boundaries of the frequency periods of the second pattern Pc12.

In the present embodiment, frequencies of the frequency periods P11 to P16 may be increased in any way.

Second Embodiment

A second embodiment is different from the first embodiment in that lengths of frequency periods included in the first pattern and the second pattern change. In the following description, the same configuration as described above is given the same reference numeral as appropriate, and description thereof will be omitted in some cases.

Figure 10:
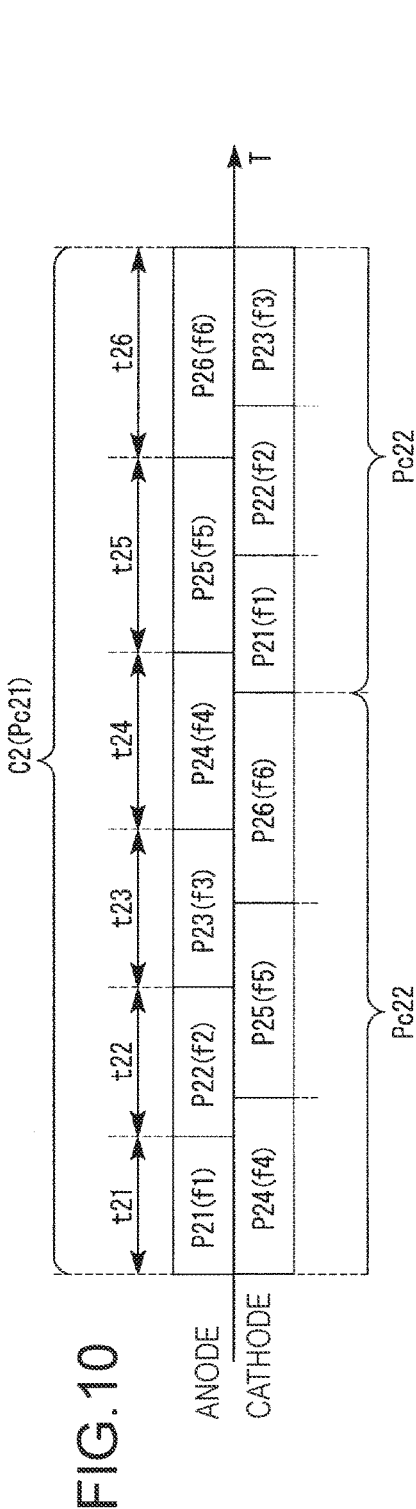
FIG. 10 is a diagram illustrating another example of a frequency change in a second embodiment.

FIG. 10 is a diagram illustrating a frequency change of the driving current I according to the present embodiment. In FIG. 10, a transverse axis expresses time T. In FIG. 10, a first pattern Pc21 of the driving current I which causes the first electrode 92 to serve as an anode, that is, the first driving current is illustrated on the upper part, and a second pattern Pc22 of the driving current I which causes the first electrode 92 to serve as a cathode, that is, the second driving current is illustrated on the lower part.

As illustrated in FIG. 10, in the present embodiment, the first pattern Pc21 and the second pattern Pc22 include a frequency period P21 in which a frequency is f1, a frequency period P22 in which a frequency is f2, a frequency period P23 in which a frequency is f3, a frequency period P24 in which a frequency is f4, a frequency period P25 in which a frequency is f5, and a frequency period P26 in which a frequency is f6 in this order. In the present embodiment, the first pattern Pc21 and the second pattern Pc22 are the same pattern, for example.

In the present embodiment, lengths of the frequency periods P21 to P26 increase as the frequency periods are provided temporally later in the pattern. In other words, a length t21 of the frequency period P21, a length t22 of the frequency period P22, a length t23 of the frequency period P23, a length t24 of the frequency period P24, a length t25 of the frequency period P25, and a length t26 of the frequency period P26 increase in this order.

The lengths t21 to t26 of the respective frequency periods P21 to P26 increase arithmetically, for example. In other words, the length t22 is a value obtained by adding a predetermined time to the length t21; the length t23 is a value obtained by adding the predetermined time to the length t22; the length t24 is a value obtained by adding the predetermined time to the length t23; the length t25 is a value obtained by adding the predetermined time to the length t24; and the length t26 is a value obtained by adding the predetermined time to the length t25.

The predetermined time is, for example, about 0.5 seconds (s) or more and about 10 seconds (s) or less. Through the above-described setting, it is possible to appropriately increase a length of a frequency period including a relatively high frequency. For this reason, it becomes easier to cause the protrusion 552p of the first electrode 92 to grow. The lengths t21 to t26 of the respective frequency periods P21 to P26 are changed within a range, for example, from about 0.5 seconds (s) to about 60 seconds (s).

The lengths t21 to t26 are determined depending on, for example, the lamp voltage Vla. Specifically, for example, as a value of the lamp voltage Vla becomes greater, the lengths t21 to t26 are set to be larger. Consequently, a heat load applied to the protrusion 552p of the first electrode 92 can be increased in a frequency period including a relatively low frequency, and thus the protrusion 552p can be easily melted even in a case where the discharge lamp 90 deteriorates. In addition, the magnitude of a predetermined time which is added arithmetically may be set to be larger as a value of the lamp voltage Vla becomes greater.

The cycle of the first pattern Pc21 and the cycle of the second pattern Pc22 are phase-shifted relative to each other. Specifically, the cycle of the first pattern Pc21 and the cycle of the second pattern Pc22 are phase-shifted relative to each other by three frequency periods. In other words, in the present embodiment, a timing at which the frequency period P24 of the second pattern Pc22 starts is the same as a timing at which the frequency period P21 of the first pattern Pc21 starts. In the present embodiment, a timing at which the frequency period P23 of the second pattern Pc22 ends is the same as a timing at which the frequency period P26 of the first pattern Pc21 ends.

In the present embodiment, the driving current I has a plurality of continuous cycles C2 in which the first pattern Pc21 is arranged in an order of the frequency periods P21 to P26 and the second pattern Pc22 is arranged in an order of the frequency periods P24 to P26 and P21 to P23.

In the present embodiment, the lengths t21 to t26 of the respective frequency periods P21 to P26 of the first pattern Pc21 and the second pattern Pc22 are different from each other, and thus start timings or end timings of the frequency periods do not necessarily match each other.

A time period in which the melted protrusion 552p of the first electrode 92 is coagulated and grows is longer than a time period in which the protrusion 552p is melted. For this reason, in order to appropriately grow the protrusion 552p, it is preferable to make the time period in which the melted protrusion 552p grows longer than the time period in which the protrusion 552p is melted.

In contrast, according to the present embodiment, the lengths t21 to t26 of the frequency periods P21 to P26 increase as the frequency periods are provided temporally later in the pattern. For this reason, it is possible to make a length of a frequency period in which a frequency is relatively high and the melted protrusion 552p grows longer than a length of a frequency period in which a frequency is relatively low and the protrusion 552p of the first electrode 92 is melted. Therefore, according to the present embodiment, it is possible to cause the protrusion 552p to appropriately grow and thus to more stably maintain a shape of the protrusion 552p.

According to the present embodiment, since the lengths t21 to t26 of the frequency periods P21 to P26 increase arithmetically, it is possible to appropriately increase a length of a frequency period including a relatively high frequency and to more stably maintain a shape of the protrusion 552p.

In the present embodiment, the lengths t21 to t26 of the frequency periods P21 to P26 may be increased in any way.

In the respective embodiments, a description has been made of an example of a case where the invention is applied to the transmissive projector, but the invention is applicable to a reflective projector. Here, the term "transmissive" indicates a type in which a liquid crystal light valve including a liquid crystal panel or the like transmits light therethrough. The term "reflective" indicates a type in which the liquid crystal light valve reflects light. A light modulation device is not limited to a liquid crystal panel or the like, and may be a light modulation device using, for example, a micro-mirror.

In the respective embodiments, a description has been made of an example of the projector 500 using the three liquid crystal panels 560R, 560G and 560B (the liquid crystal light valves 330R, 330G and 330B), but the invention is applicable to a projector using only a single liquid crystal panel, and to a projector four or more liquid crystal panels.

The configurations of the above-described respective embodiments may be combined with each other as appropriate so as not to cause contradiction therebetween.

The entire disclosure of Japanese Patent Application No. 2015-053043, filed Mar. 17, 2015 is expressly incorporated by reference herein.

What is claimed is:

1. A discharge lamp driving device comprising:
   a discharge lamp driving unit configured to supply a driving current to a discharge lamp including a first electrode and a second electrode; and
   a control unit configured to control the discharge lamp driving unit,
   wherein the driving current includes a first positive driving current which causes the first electrode to serve as an anode and a second negative driving current which causes the second electrode to serve as an anode,
   wherein the control unit controls the discharge lamp driving unit so that the first positive driving current and the second negative driving current are alternately supplied to the discharge lamp, a period over which the first positive driving current is supplied is changed according to a periodic first pattern, and a period over which the second negative driving current is supplied is changed according to a periodic second pattern,
   wherein the first pattern and the second pattern are patterns in which the length of the periods over which the respective driving current is supplied to the discharge lamp decreases over time within each cycle of the pattern, and
   wherein the cycle of the first pattern is phase-shifted relative to the cycle of the second pattern.

2. The discharge lamp driving device according to claim 1,
   wherein the cycle of the first pattern is phase-shifted relative to the cycle of the second pattern by a half cycle.

3. The discharge lamp driving device according to claim 1,
   wherein each of the first pattern and the second pattern has a plurality of frequency periods,
   wherein the lengths of the periods over which the respective driving current is supplied to the discharge lamp are constant within each frequency period and vary between different frequency periods, and
   wherein each frequency period has the same length.

4. The discharge lamp driving device according to claim 1,
   wherein each of the first pattern and the second pattern has a plurality of frequency periods,
   wherein the lengths of the periods over which the respective driving current is supplied to the discharge lamp are constant within each frequency period and vary between different frequency periods, and
   wherein lengths of the frequency periods increase as the frequency periods are provided temporally later in the first pattern and the second pattern.

5. The discharge lamp driving device according to claim 4,
   wherein the lengths of the frequency periods increase arithmetically for each of the frequency periods.

6. The discharge lamp driving device according to claim 3,
   wherein the periods of the driving current in the frequency periods decrease geometrically from one frequency period to the next within the first pattern and the second pattern.

7. The discharge lamp driving device according to claim 1,
   wherein the first pattern and the second pattern are the same pattern.

8. The discharge lamp driving device according to claim 1,
   wherein each of the first pattern and the second pattern has a plurality of AC periods during each of which the frequency of the first positive driving current is constant and the frequency of the second negative driving current is constant, and
   wherein the duration of a combination of a first period in which the first positive driving current is supplied and a second period in which the second negative driving current is temporally adjacent to the first period varies between one AC period and the next AC period.

9. A projector comprising:
a discharge lamp configured to emit light;
the discharge lamp driving device according to claim 1;
a light modulation device configured to modulate light emitted from the discharge lamp according to an image signal; and
a projection optical system configured to project the light which is modulated by the light modulation device.

10. A projector comprising:
a discharge lamp configured to emit light;
the discharge lamp driving device according to claim 2;
a light modulation device configured to modulate light emitted from the discharge lamp according to an image signal; and
a projection optical system configured to project the light which is modulated by the light modulation device.

11. A projector comprising:
a discharge lamp configured to emit light;
the discharge lamp driving device according to claim 3;
a light modulation device configured to modulate light emitted from the discharge lamp according to an image signal; and
a projection optical system configured to project the light which is modulated by the light modulation device.

12. A projector comprising:
a discharge lamp configured to emit light;
the discharge lamp driving device according to claim 4;
a light modulation device configured to modulate light emitted from the discharge lamp according to an image signal; and
a projection optical system configured to project the light which is modulated by the light modulation device.

13. A projector comprising:
a discharge lamp configured to emit light;
the discharge lamp driving device according to claim 5;
a light modulation device configured to modulate light emitted from the discharge lamp according to an image signal; and
a projection optical system configured to project the light which is modulated by the light modulation device.

14. A projector comprising:
a discharge lamp configured to emit light;
the discharge lamp driving device according to claim 6;
a light modulation device configured to modulate light emitted from the discharge lamp according to an image signal; and
a projection optical system configured to project the light which is modulated by the light modulation device.

15. A projector comprising:
a discharge lamp configured to emit light;
the discharge lamp driving device according to claim 7;
a light modulation device configured to modulate light emitted from the discharge lamp according to an image signal; and
a projection optical system configured to project the light which is modulated by the light modulation device.

16. A projector comprising:
a discharge lamp configured to emit light;
the discharge lamp driving device according to claim 8;
a light modulation device configured to modulate light emitted from the discharge lamp according to an image signal; and
a projection optical system configured to project the light which is modulated by the light modulation device.

17. A discharge lamp driving method of supplying a driving current to a discharge lamp including a first electrode and a second electrode and driving the discharge lamp, the method comprising:
alternately supplying a first positive driving current which causes the first electrode to serve as an anode and a second negative driving current which causes the second electrode to serve as an anode to the discharge lamp;
changing a period over which the first positive driving current is supplied according to a periodic first pattern; and
changing a period over which the second negative driving current is supplied according to a periodic second pattern,
wherein the first pattern and the second pattern are patterns in which the lengths of the periods over which the respective driving current is supplied to the discharge lamp decrease over time within each cycle of the pattern, and
wherein the cycle of the first pattern is phase-shifted relative to the cycle of the second pattern.

18. The discharge lamp driving device according to claim 1,
wherein each of the first pattern and the second pattern has a plurality of frequency periods in which the driving current is supplied,
wherein frequencies of the driving current in each frequency period are different from each other, and
wherein each frequency period has a plurality of cycles comprising a first period in which the first positive driving current is supplied and a second period in which the second negative driving current is temporally adjacent to the first period, each length of cycles included in one frequency period being the same.

* * * * *